United States Patent
Jonakin et al.

[15] 3,637,347
[45] Jan. 25, 1972

[54] AIR POLLUTION CONTROL SYSTEM WITH CHEMICAL RECOVERY

[72] Inventors: James Jonakin, Simsbury; Arthur L. Plumley, Wapping, both of Conn.

[73] Assignee: Combustion Engineering, Inc., Windsor, Conn.

[22] Filed: July 31, 1969

[21] Appl. No.: 846,331

[52] U.S. Cl. .................................23/122, 23/119, 23/128, 23/193, 23/201
[51] Int. Cl. ....................C01f 11/46, C01f 5/40, C01c 1/24
[58] Field of Search...................23/122, 128, 178, 119, 193, 23/201

[56] References Cited

UNITED STATES PATENTS

| 932,130 | 8/1909 | Hunter | 23/122 X |
|---|---|---|---|
| 1,900,392 | 3/1933 | Stump | 23/128 |
| 2,345,655 | 4/1944 | Brandenburg | 23/128 |
| 2,659,661 | 11/1953 | Keitel | 23/122 X |
| 2,781,245 | 2/1957 | Robertson et al. | 23/122 X |
| 3,320,906 | 5/1967 | Domahidy | 23/178 X |

FOREIGN PATENTS OR APPLICATIONS 625,649 7/1949 Great Britain.........................23/128

*Primary Examiner*—Edward Stern
*Attorney*—Carlton F. Bryant, Eldon H. Luther, Robert L. Olson, John F. Carney, Richard H. Berneike, Edward L. Kochey, Jr. and Lawrence P. Kessler

[57] ABSTRACT

A system and process is described for treating the effluent chemicals from an air pollution control system for fossil fuel fired equipment. The air pollution control system involves the addition of magnesium-containing additives such as dolomite to the equipment followed by the wet scrubbing of the flue gases resulting in the reaction of the sulfur oxides with the additive. The treatment involves the addition of ammonium hydroxide to the solution removed from the scrubber to convert the soluble magnesium sulfate to soluble ammonium sulfate and precipitate magnesium hydroxide. The ammonium sulfate solution is removed from the magnesium hydroxide and either used for fertilizer or further reacted with calcium oxide to precipitate calcium sulfate and form ammonium hydroxide which is recycled for reaction with the scrubber effluent.

4 Claims, 1 Drawing Figure

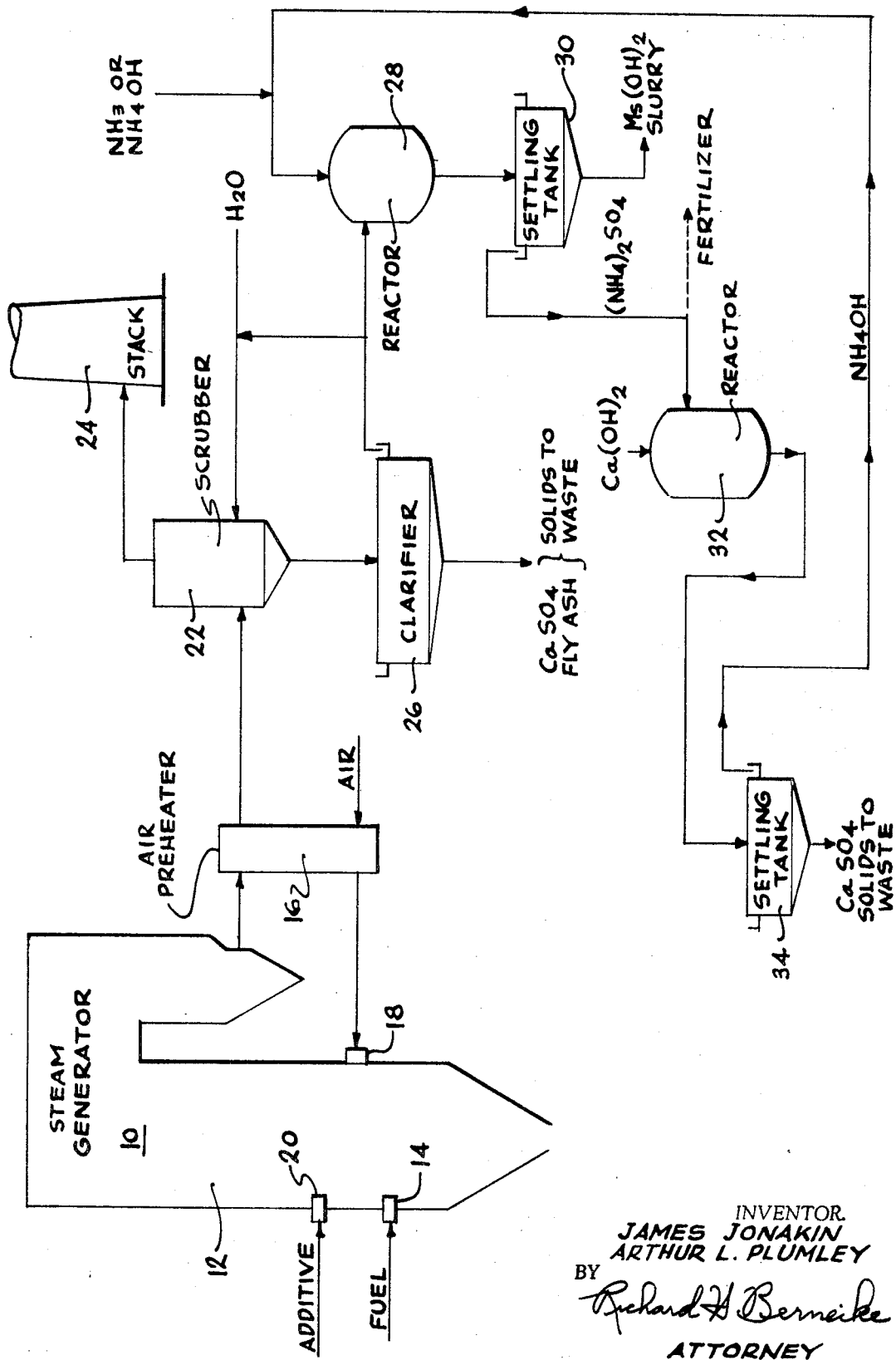

AIR POLLUTION CONTROL SYSTEM WITH CHEMICAL RECOVERY

BACKGROUND OF THE INVENTION

Air pollution has become a major problem in recent years and there is currently much time, effort and expense being put forth to devise economical schemes for reducing this pollution. One of the many sources of air pollution is the flue gases emitted from fuel-burning equipment such as steam generating units. The sulfur oxides, $SO_2$ and $SO_3$, are of major concern as air pollutants in such flue gases. The particulate matter such as fly ash and other dust particles also contribute to the pollution problem if not completely removed. The schemes which have been developed to date to remove these obnoxious flue gas constituents have involved either or both high capital investment and high operating costs rendering the schemes impractical.

One solution to this air pollution control problem is the system and method described in U.S. Pat. application Ser. No. 517,215 filed Dec. 29, 1965, now abandoned, in the name of J. Jonakin, J. D. Sensenbaugh, and V. Z. Caracristi. Although this system will be more fully described hereinafter, it basically involves the addition of magnesium- and calcium-containing additives such as dolomite to the furnace where the additive is converted to the oxide form. The additive reacts in the gas phase with only a portion of the sulfur oxides to form magnesium and calcium sulfates and sulfites. The products of combustion containing the unreacted additive and sulfur oxides as well as the particulate sulfates, sulfites and fly ash are then wet scrubbed with water which removes the particulate matter and which provides an environment in which the reaction of the additive and sulfur oxides can progress substantially to completion. The slurry flowing from the scrubber contains solid calcium sulfate, calcium sulfite, magnesium sulfite and fly ash and it also contains magnesium sulfate in solution. The prior method of disposing of this scrubber effluent was to conduct it to large storage ponds and allow a large portion of the water to evaporate after which the remaining sludge is carried away.

SUMMARY OF THE INVENTION

The object of the present invention relates to the treatment of the scrubber slurry described above to remove the soluble magnesium sulfate. This involves reacting the effluent solution from the scrubber to precipitate a magnesium compound leaving the sulfate in solution. The sulfate solution may then be further processed to precipitate a sulfate compound and produce a solution which may be recycled for reaction with the scrubber effluent solution. These and other objects as well as the advantages of the invention will be more fully understood from the detailed description which follows.

BRIEF DESCRIPTION OF THE DRAWING

The drawing is a flow diagram illustrating an air pollution control system for a steam generator including a scrubber and the system for processing the scrubber effluent.

DESCRIPTION OF THE PREFERRED EMBODIMENT

Referring now to the drawing, the invention is illustrated in conjunction with a steam generating unit 10 which includes a furnace portion 12. The fuel, which may be any of the conventional fossil fuels containing sulfur compounds such as coal, oil or natural gas, is introduced into the furnace through burners 14. The combustion air, which has been heated in the air preheater 16, is introduced into the furnace through ports 18. The combustion products pass through the furnace contacting the heat transfer surfaces and are then conducted out of the steam generator and back to the air preheater 16 in which a portion of the heat remaining in the combustion products is transferred to the combustion air.

During the combustion process, the sulfur compounds in the fuel are converted to $SO_2$ and $SO_3$. These sulfur oxides can enter into reactions in the furnace to form corrosive complex compounds on the high temperature heat transfer surfaces and sulfuric acid on the low temperature surfaces such as the air preheater. To prevent this low temperature corrosion, the gas temperatures are normally maintained above the acid dew point in which case a majority of the sulfur oxides are passed through the furnace and emitted to the atmosphere through the stack.

The air pollution control system forming a portion of the present invention which is more completely described in the prior mentioned U.S. Pat. application Ser. No. 517,215, involves the addition of magnesium- and calcium-containing additives such as dolomite to the furnace through nozzles 20. The method of introducing the additive may take any desired form; for instance, it can be mixed with the fuel prior to its introduction into the furnace or it can be added separately. Should the additives be in the carbonate form, as they would be in dolomite, they will be calcined in the furnace to the oxide form. These oxides will react with the sulfur compounds $SO_2$ and $SO_3$ to yield calcium and magnesium sulfate and sulfite. The sulfites will be substantially all oxidized to the sulfate form. These reactions will take place at least to a limited extent during the passage of the flue gases through the steam-generating unit 10 which will tend to reduce the corrosion occurring on the heat transfer surfaces in the unit. Substantially all of the $SO_3$ will be reacted before it reaches the low temperature surfaces thus eliminating the sulfuric acid corrosion problem. However, only about 30 percent of the total sulfur compounds in the flue gases will be reacted with dolomite-type materials prior to exit from the unit which is insufficient to adequately control air pollution.

In order to complete the reaction of the sulfur compounds with the additive and also to remove the particulate matter from the flue gases including the sulfates, the effluent from the steam generator is passed to a wet scrubber 22 before it is released to the atmosphere through the stack 24. The calcium and magnesium oxides which are formed by the calcination of the carbonates in the additive form hydroxides with the scrubber water. The $SO_2$ and $SO_3$ are only slightly soluble in the scrubber water and they react rapidly with the calcium and magnesium hydroxides in the scrubber water as well as with any undissolved calcium and magnesium oxides and hydroxides. Perhaps about 98 or 99 percent of the sulfur compounds can be removed by this process. The wet scrubber also removes other particulate matter or dust from the flue gas stream such as the fly ash and the inerts which may have been present in the raw additive. The dust collection efficiency may be greater than 99 percent thus eliminating the need for electrostatic precipitators or other dust removal apparatus. The wet scrubber 22 therefore serves both as a means for removing solids from the gas stream as well as a means for promoting the reaction of the sulfur compounds with the additive.

The reaction products of the sulfur compounds with the additive are all relatively insoluble and can be readily removed from the scrubber water with the exception of the magnesium sulfate which is relatively soluble in water. This solubility of the magnesium sulfate gives rise to the present invention. The effluent slurry from the scrubber 22 is processed in a clarifier 26 in which the solid sulfates and any unoxidized sulfites as well as the fly ash are removed from the scrubber solution. A portion of the supernatant liquid from the clarifier 26 is recycled to the scrubber 22 along with fresh makeup water. This recycle has the effect of conserving scrubbing water and building up the concentration of dissolved magnesium sulfate. The remaining liquid from the clarifier is carried to a reactor 28. A solution of ammonium hydroxide is also added to the reactor 28 in which the following reaction takes place:

(1)  $MgSO_4 + 2NH_4OH \rightarrow Mg(OH)_2 + (NH_4)_2SO_4$

The magnesium hydroxide will precipitate, leaving an ammonium sulfate solution. The effluent from the reactor 28 is carried to the settling tank 30 in which the precipitated magnesium hydroxide is separated from the solution. The reactor 28 and the settling tank 30 may be combined into a single piece of equipment in which the reaction and settling are carried on simultaneously. The magnesium hydroxide slurry from the settling tank 30 may be used in that form or it may be further processed such as in a kiln in which it is converted to magnesium oxide. The sale or other use of the magnesium compounds results in a return which lowers the operating costs of the system.

The supernatant ammonium sulfate solution from the settling tank 30 may either be utilized in the production of fertilizer or may be further processed as shown in the drawing. This solution is carried to the reactor 32 to which is added calcium hydroxide or calcium oxide resulting in the following reaction:

(2)  $(NH_4)_2SO_4 + Ca(OH)_2 \rightarrow 2NH_4OH + CaSO_4$

Of course, other reactants could be added such as barium hydroxide, but calcium hydroxide is preferred. The effluent from the reactor 32 is carried to the settling tank 34 in which the precipitated calcium sulfate is separated from the remaining ammonium hydroxide solution. This calcium sulfate is then carried to waste along with the solids from the clarifier 26. The supernatant ammonium hydroxide solution from the settling tank 34 is then recycled to the reactor 28 for reaction with the magnesium sulfate. Additional ammonia or ammonium hydroxide is added to this recycle so as to make up the ammonia lost from the system with the magnesium hydroxide and calcium sulfate or by withdrawal of ammonium sulfate. It is also obvious that the reactor 32 and settling tank 34 may be combined into a single apparatus.

We claim:
1. A method of reducing pollution caused by the combustion of sulfur-containing fuel comprising the steps of:
 a. burning said sulfur-containing fuel to form a gas stream containing sulfur oxides,
 b. introducing into said gas stream an additive containing a magnesium compound selected from the group consisting of magnesium oxide and compounds which produce magnesium oxide in said gas stream,
 c. wet scrubbing said gas stream containing said additive with water whereby said magnesium oxide and said sulfur oxides are reacted to produce a magnesium sulfate solution,
 d. introducing ammonium hydroxide into at least a portion of said magnesium sulfate solution whereby magnesium hydroxide is precipitated and ammonium sulfate solution is formed,
 e. separating precipitated magnesium hydroxide from said ammonium sulfate solution,
 f. reacting said ammonium sulfate solution with a metallic hydroxide selected from the group consisting of calcium hydroxide and barium hydroxide to produce a precipitated sulfate and an ammonium hydroxide solution,
 g. separating said precipitated sulfate from said ammonium hydroxide solution, and
 h. recycling said ammonium hydroxide solution for reaction in step (d) with said magnesium sulfate solution.

2. A method as recited in claim 1 wherein said hydroxide material in step (e) is calcium hydroxide and said precipitated sulfate is calcium sulfate.

3. A method as recited in claim 1 wherein another portion of said magnesium sulfate solution together with additional makeup water is employed for wet scrubbing.

4. A method of reducing pollution caused by the combustion of sulfur-containing fuel comprising the steps of:
 a. burning said sulfur-containing fuel to form hot products of combustion containing sulfur oxides;
 b. introducing into said hot products of combustion an additive containing magnesium carbonate and calcium carbonate which decompose to magnesium oxide and calcium oxide when subjected to the heat of said products of combustion which will react with said sulfur oxides;
 c. wet scrubbing said products of combustion containing said additive with water whereby dissolved magnesium sulfate and precipitated calcium sulfate are formed in said scrubber water;
 d. separating said precipitated calcium sulfate from said scrubber water containing said dissolved magnesium sulfate;
 e. recycling a first portion of said separated scrubber water together with additional makeup water for said wet scrubbing;
 f. introducing ammonium hydroxide into a second portion of said separated scrubber water and thereby reacting said ammonium hydroxide with said dissolved magnesium sulfate to form ammonium sulfate solution and precipitated magnesium hydroxide;
 g. separating said precipitated magnesium hydroxide from said ammonium sulfate solution;
 h. reacting said separated ammonium sulfate solution with calcium hydroxide so as to produce an ammonium hydroxide solution and precipitated calcium sulfate;
 i. separating said ammonium hydroxide solution from said precipitated calcium sulfate; and
 j. recycling said ammonium hydroxide solution together with additional ammonium hydroxide solution for reaction with said magnesium sulfate solution.

* * * * *